3,230,213
PREPARATION OF AMINOGUANIDINE DERIVATIVES
Charles L. Mehltretter, Peoria, Ill., assignor to the United States of America as represented by the Secretary of Agriculture
No Drawing. Filed July 19, 1962, Ser. No. 211,140
2 Claims. (Cl. 260—233.3)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to aminoguanidine derivatives, to processes for their preparation, and to compositions containing them. According to the present invention there are provided novel guanylhydrazones prepared by reaction of commercially available aminoguanidine salts with oxidized starches containing carbonyl groups, according to the following equation:

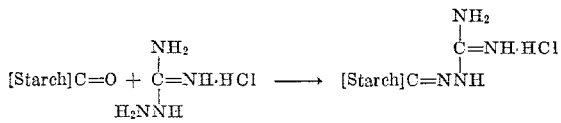

These novel guanylhydrazones are particularly valuable as cationic agents for retention of dyes and pigments on cellulosic fibers and as compositions, particularly with the guanylhydrazones of the more highly oxidized dialdehyde starch starting materials, for providing dry and wet strength in paper by addition to cellulosic fibers prior to sheet formation.

My novel guanylhydrazones gelatinize in hot water to produce dispersions which are positively charged and have a cationic effect at various pH levels. They are thus substantive to negatively charged cellulosic fibers and to anionic pigments and dyes.

Conventional methods for preparing cationic starches which includes oxystarches of low degree of carbonyl content as described in U.S. Patents 2,876,217 and 2,917,506 involve the introduction of tertiary and quaternary nitrogen groups to the starch molecule by reaction of the free hydroxyl groups of starch with appropriate cationic substances under alkaline conditions. Cationic oxidized starches thus prepared generally have been severely degraded under the strongly alkaline conditions required to effect reaction of the free hydroxyl groups in the oxidized starch. It is known that oxidized polysaccharides are readily susceptible to degradation with alkali through their carbonyl function. It is stated in Advances in Carbohydrate Chemistry, vol. 13, pages 316, 317 (1958), that the greater the carbonyl content of the polysaccharides starch or cellulose the greater is the molecular degradation in the presence of alkali.

I have discovered that products possessing cationic properties can be prepared by reacting the carbonyl groups in oxidized starches with soluble salts of aminoguanidine using aqueous acidic conditions. Under these conditions high yields of essentially colorless products are obtained with essentially no degradation of the oxidized starch molecule.

The presence of electropositive primary amino and imino groups in the products of the invention are believed to additively produce the exceptionally pronounced cationic properties observed in gelatinized dispersions of the ionized salts of the guanylhydrazones in water.

The main object of this invention is the synthesis of new cationic hydrazones containing both primary amino and imino groupings by reaction in water of oxidized starches containing reactive carbonyl groups with soluble aminoguanidine salts under acidic conditions. Partial substitution of the carbonyl groups in substantially fully oxidized starches is preferred for economic reasons. Further objects will be apparent from the following detailed description.

These objects have been accomplished by reacting any water-soluble aminoguanidine salt with a water-insoluble oxidized starch in an acid aqueous system for at least one hour at a non-gelatinizing temperature within the range of 25° to about 40° C. using up to one-fifth part by weight of the aminoguanidine salt per part of the oxidized starch but preferably 0.5 percent to about 10 percent by weight. The water-insoluble oxidized starch is continuously stirred in the acid aqueous reaction mixture and is reacted in the granule state. The white product is isolated by filtration and washed with water before drying. The yields are quantitative.

The carbonyl groups of the oxidized starches react with the aminoguanidine salts to form hydrazones. However, it is preferred to react only about 0.5 to 10 percent of the carbonyl groups present in the highly oxidized (dialdehyde) starches. Essentially all of the carbonyl groups are preferred to be reacted in the oxystarches containing a low carbonyl content of up to about 6 percent, although only a portion of the carbonyl groups may be reacted. The highly oxidized starches as is well known may be prepared by periodate oxidation of starch. The commercially available lowly oxidized starches are generally produced by hypochlorite or chlorine oxidation of corn starch or other starches such as those of potato, wheat, sorghum, and tapioca.

The following examples illustrate the invention.

Example 1

25 grams of dialdehyde starch (corn starch oxidized with periodic acid to 93 percent dialdehyde content) was stirred in 75 ml. of water at room temperature. To the continuously stirred slurry was added 25 ml. of an aqueous solution of aminoguanidine hydrochloride prepared by acidification of 2.5 grams of commercial aminoguanidine bicarbonate with hydrochloric acid. The pH of the reaction mixture was about 3. Reaction was continued at room temperature for 16 hours when the mixture was filtered or centrifuged off. The white product was washed with water and then with methanol and dried at 40° C. overnight. The recovery of white product was 27.4 grams. Nitrogen content was 2.99 percent (dry basis). Moisture was 13.1 percent.

The nitrogen content showed that about 5 percent of the carbonyl groups of the dialdehyde starch had reacted with aminoguanidine hydrochloride to form a partial hydrazone.

3 percent dispersions of this product in water at 90° C. for 30 minutes were fairly clear and only slightly viscous. Applications to cellulosic pulp showed good substantivity and gave the pulp a positive charge. Paper prepared with pulp treated with this product had good wet strength and improved dry strength.

Example 2

25 grams of dialdehyde starch of Example 1 was stirred in 75 ml. of water at 38–40° C. To the continuously stirred slurry was added 25 ml. of an aqueous solution of aminoguanidine hydrochloride prepared by acidification of 2.5 grams of aminoguanidine bicarbonate with hydrochloric acid. The reaction mixture at pH 2–3 was stirred at 38–40° C. for 2 hours. It was then filtered, washed with water and dried at 40° C. overnight.

The yield of white product was 26.1 grams. Nitrogen analysis was 3.17 percent (dry basis).

A water dispersion of the product showed substantivity to cellulosic pulp, and gave the pulp a positive charge. The treated pulp highly absorbed an anionic dye from solution.

*Example 3*

36 grams of a commercial hypochlorite oxidized starch was slurried in 100 ml. of water and 25 ml. of water containing aminoguanidine hydrochloride prepared by acidification of 2.72 grams of aminoguanidine bicarbonate to pH 2. The mixture was stirred at room temperature for 20 hours and filtered. After 2 washings with water the white product was dried at 40° C. The yield was 34.7 g. Nitrogen content was 2 percent (dry basis).

The product was gelatinized and dispersed in hot water and showed cationic activity.

*Example 4*

36 grams of dialdehyde starch of Example 1 was slurried in 100 ml. of water to which was added 25 ml. of water containing aminoguanidine hydrochloride prepared by acidification to pH 2-3 of 4.08 grams of aminoguanidine bicarbonate with hydrochloric acid. The reaction was run at 32° C. for 2 hours. The white product was filtered, washed with water and dried. The dry product weighed 35.5 grams. Nitrogen content was 3.2 percent (dry basis).

The product gelatinized and dispersed in hot water had cationic properties as shown by its absorption of an anionic dye as in Example 2.

*Example 5*

25 grams of slightly oxidized starch prepared by periodate oxidation of corn starch to contain 3 percent dialdehyde content of theory was stirred in 75 ml. of water. To the stirred slurry was added 25 ml. of a water solution containing aminoguanidine hydrochloride prepared by acidification of 2.5 grams of aminoguanidine bicarbonate with hydrochloric acid. The reaction was carried out for 4 hours at 30° C. The white product was filtered and washed with water. After drying it weighed 24.5 grams and contained 2.5 percent nitrogen (dry basis). Essentially all of the aldehyde groups had reacted.

The product was dispersed in hot water and showed cationic activity.

I claim:

1. A cationic substantially fully oxidized starch hydrazone in which the carbonyl oxygens in about 5 percent of the originally present carbonyl groups in the periodate oxidized starch have been directly substituted by

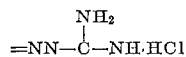

groups.

2. A process for producing a cationic substantially fully oxidized starch hydrazone wherein about 5 percent of the carbonyl oxygens originally present in the periodate-oxidized starch have been directly substituted by

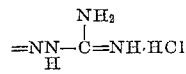

groups, said process comprising reacting a periodate-oxidized starch containing about 93 percent of theory of dialdehyde groups with about 10 percent, based on the weight of said starch, of a soluble salt of aminoguanidine in an aqueous medium at about pH 2–4 and a temperature of about 25–40° C.

References Cited by the Examiner

UNITED STATES PATENTS

| | | | |
|---|---|---|---|
| 2,736,749 | 2/1956 | Robinson | 260—69 |
| 2,822,312 | 2/1958 | Bretscher et al. | 260—69 |
| 2,512,671 | 6/1950 | Novotny et al. | 260—69 |
| 3,098,869 | 7/1963 | Borchert | 260—233.3 |

LEON J. BERCOVITZ, *Primary Examiner.*

JAMES A. SEIDLECK, *Examiner.*

J. M. DULIN, R. W. MULCAHY, *Assistant Examiners.*